Sept. 16, 1969  F. P. WALTERS  3,467,467
SHUTTER AND FILM DRIVE FOR CINECAMERA
Filed May 2, 1967  2 Sheets-Sheet 1
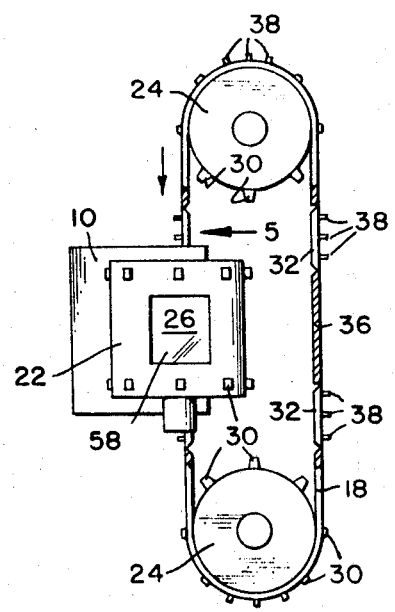
FIG. 2.
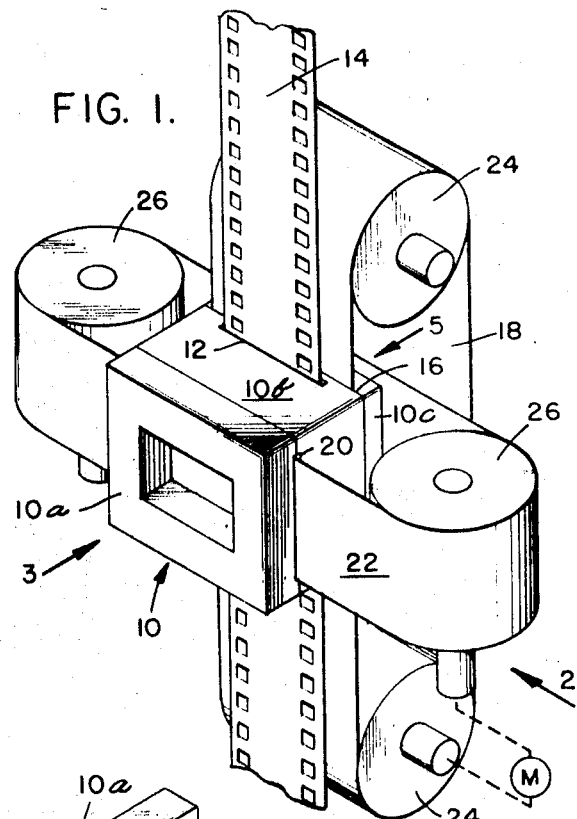
FIG. 1.
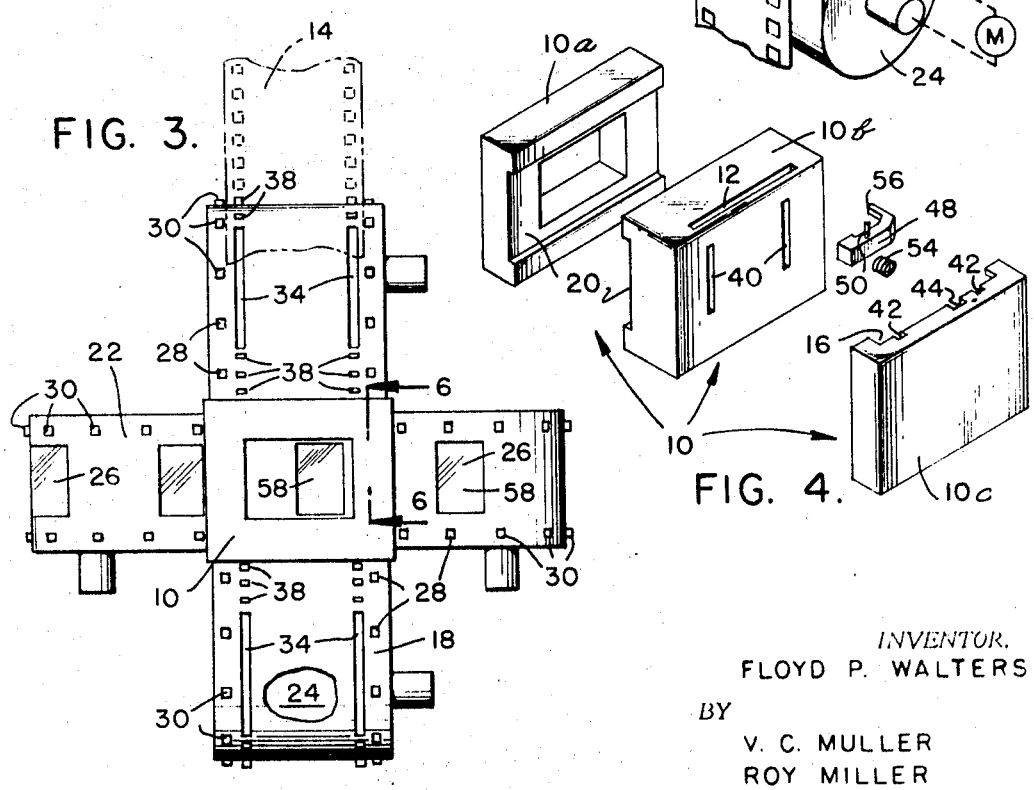
FIG. 3.
FIG. 4.
INVENTOR.
FLOYD P. WALTERS
BY
V. C. MULLER
ROY MILLER
ATTORNEYS.

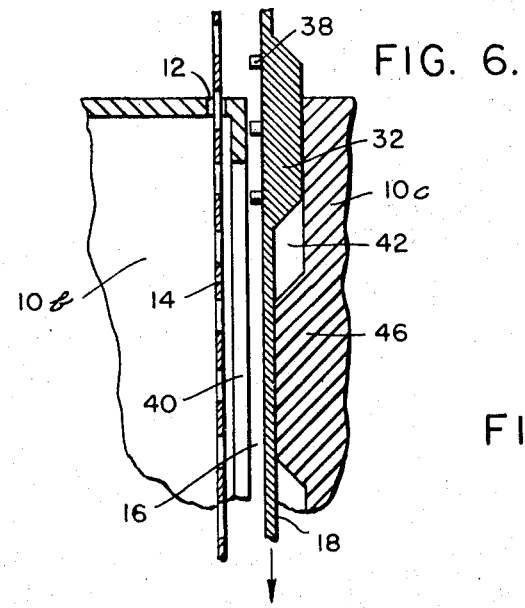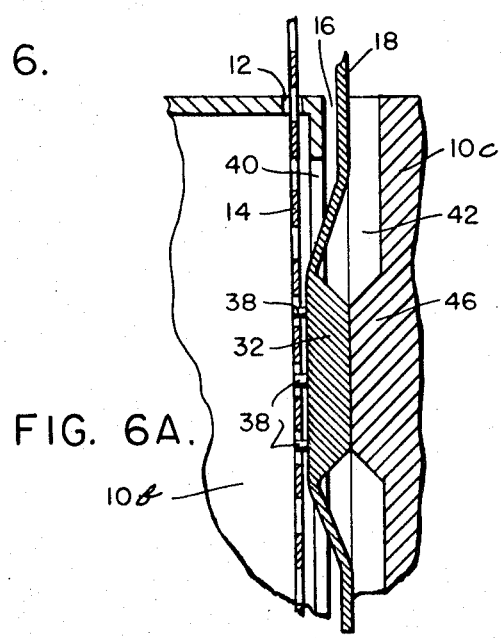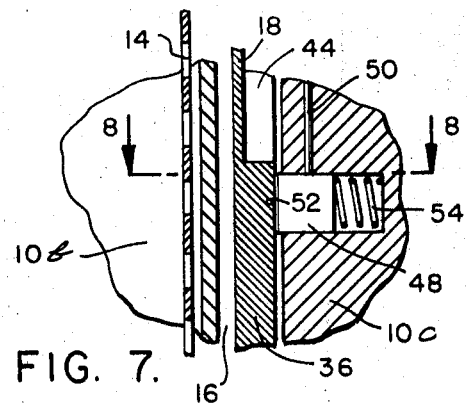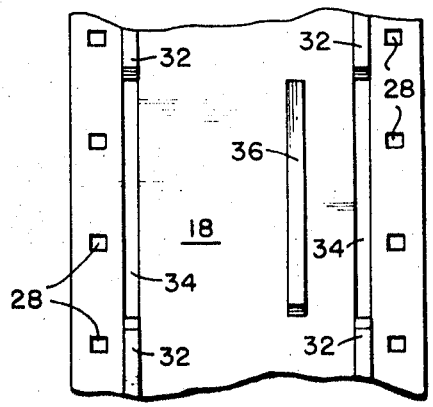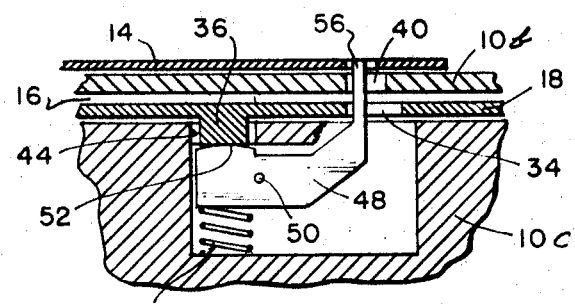

United States Patent Office 3,467,467
Patented Sept. 16, 1969

3,467,467
SHUTTER AND FILM DRIVE FOR CINECAMERA
Floyd P. Walters, 309B Monterey,
China Lake, Calif. 93555
Filed May 2, 1967, Ser. No. 635,978
Int. Cl. G03b 1/00
U.S. Cl. 352—183    4 Claims

ABSTRACT OF THE DISCLOSURE

A film drive mechanism for motion picture film has a continuously moving endless belt. Projections on the front side of the belt periodically engage the film drive apertures and intermittently advance the film. Projections on the rear side of the belt periodically engage a registering pin and pivot the pin to a position where it engages an aperture in the film and holds the film in a predetermined position while at rest. A second continuously moving endless belt comprises a shutter which moves perpendicularly to the movement of the first belt and moves in synchronism with the first belt.

---

The invention described herein may be manufactured and used by or for the Government of the United States of America for governmental purposes without the payment of any royalties thereon or therefor.

The invention relates to cinematography and more particularly to improvements in apparatus for advancing film and opening and closing a shutter.

One of the objects of the invention is to provide a camera with constantly moving parts in distinction to complex mechanisms which involve conversion of rotary motion to intermittent translational motion.

Another object is to provide film transport and shutter apparatus which permits increased ratio of shutter open time to shutter closed time.

A further object is to provide film transport and shutter apparatus which is simple in construction and economical of manufacture.

Still further objects, advantages, and salient features will become apparent from the description to follow, the appended claims, and the accompanying drawing, in which:

FIG. 1 is an isometric view of the general arrangement of parts, details being omitted;

FIG. 2 is a side elevation as viewed in the direction of arrow 2, FIG. 1, portions being shown in section;

FIG. 3 is an elevation as viewed in the direction of arrow 3, FIG. 1, with the film broken away;

FIG. 4 is an exploded view of parts of the previous figures;

FIG. 5 is an elevation of a portion of the transport belt, as viewed in the direction of arrow 5, FIGS. 1 and 2;

FIG. 6 is a section taken on line 6—6, FIG. 3;

FIG. 6A is a like section with parts in different positions;

FIG. 7 is a section like FIG. 6 illustrating a different portion of the transport belt; and FIG. 8 is a section taken on line 8—8, FIG. 7.

Referring now to the drawing, and first to FIG. 1, the subject of the invention comprises, in general, a belt and film guide member 10, formed in three parts 10a, 10b, 10c, having a slot 12 through which film 14 moves, a slot 16 through which transport belt 18 moves and a slot 20 through which shutter belt 22 moves, the two endless belts being supported by sprocketed pulleys 24, 24 and 26, 26, respectively, as best shown in FIGS. 2 and 3. The pulleys are supported for rotation in any suitable journals (not shown) and are driven in synchronism at suitable relative speeds, preferably by a single motor or other drive M as diagrammatically illustrated in FIG. 1.

Referring now to FIG. 5, transport belt 18 is fabricated of thin flexible material and is provided with a row of perforations 28 adjacent each edge which engage sprocket teeth 30 (FIG. 2) on pulleys 24, 24. Its inner face is provided with pairs of spaced transversely aligned ramps 32, 32 and slots 34, 34 extending between the longitudinally aligned ramps. Spaced longitudinally aligned ramps 36 are also provided which extend substantially the length of slots 34. The outer face of the transport belt is provided with longitudinally spaced sets of lugs or teeth 38 disposed in longitudinal alignment with slots 34. The transverse distance between the slots 34 and teeth 38 is thus the same and the same spacing as between the two rows of perforations on film 14. As best shown in FIG. 4, the central portion 10b of member 10 is provided with a pair of parallel slots 40 which are also spaced the distance between rows of perforations on the film. The rear portion 10c of member 10 is provided with a pair of parallel slots or grooves 42, 42 through which ramps 32, 32 may pass and a similar slot or groove 44, through which ramps 36 may pass. As best shown in FIG. 6, slots 42, 42 are provided with ramps or camming surfaces 46, and as best shown in FIG. 7, a film locking member 48, pivoted on pin 50 has a portion 52 which extends into slot 44 under urge of a spring 54. Its other end is provided with a finger 56 engageable in the film perforations.

In the operation of the transport belt, and referring to FIG. 6, ramp 32 has entered slot 42 and is about to engage cam 46. As shown in FIG. 6A, ramp 32 has engaged cam 46 which has distorted the belt and moved teeth 38 through slots 40 and into engagement with the film perforations. The film is now moving with the belt and moves a distance of one frame at which time ramp 32 disengages from cam 46 and teeth 38 disengage from the film. At the time of disengagement, and referring to FIGS. 7 and 8, ramp 36 has engaged member 48, rotating it and moving finger 56 through one of slots 34 in the belt, through one of slots 40 in member 10b and into a perforation in the film, locking it against movement. During the time the film is locked against movement the film is exposed by opening and closing of a shutter, this preferably being in the form of a constantly moving opaque focal plane shutter belt 22 having suitable spaced windows 58 in same. When ramp 36 moves out of engagement with member 48, the film is unlocked and is again moved one frame as illustrated and described in connection with FIGS. 6, 6A.

As will now be apparent, the time required to move the film from one frame to the next is the time required for ramps 32 to move across cam 46. The time available for shutter opening and closing is the time required for ramps 36 to move across locking member 48. Since the transport belt is moving at constant velocity, the ratio of shutter open time to shutter closed time may be chosen as desired by the relative lengths of ramps 32 and ramps 36. Thus, as the length of ramps 36 is increased relative to ramps 32, the ratio of shutter open time to shutter closed time is increased. As illustrated in FIG. 2 this ratio is about 2, however, it is to be understood that ramps 36 may be longer if desired. If increased, the transport belt may be moved more rapidly in order to obtain the same number of exposed frames per second.

While the apparatus may be employed in a motion picture camera for use in general photography of moving objects, the high ratio of shutter open time to shutter closed time, when desired, makes it of particular utility in the photography of television displays. When so used, a photo diode detector may be located adjacent the shutter belt which detects a point, or a plurality of equispaced points on the belt, as it moves past the detector. The output of the photo diode circuit is compared with the scan synchronizing pulse of the display equipment and the difference in time between the pulses controls the phase angle of the voltage applied to the drive motor. This allows the shutter openings in the belt to remain synchronized to the field or frame rate of the display equipment.

Obviously many modifications and variations of the present invention are possible in the light of the above teachings. It is therefore to be understood that within the scope of the appended claims the invention may be practiced otherwise than as specifically described.

What is claimed is:

1. Apparatus for intermittently moving perforated photographic film from one frame to the next exposing same, comprising;
    (a) a constantly moving endless film transport belt having a portion thereof disposed adjacent the film and movable substantially parallel therewith, said belt having inner and outer faces,
    (b) linearly spaced film transporting ramps on the inner face of the belt,
    (c) film perforation engaging means on the outer face of the belt, opposite the film transporting ramps,
    (d) a stationary camming surface engageable with the film transporting ramps for moving the perforation engaging means into and out of engagement with the film perforations as the film transporting ramps pass across the camming surface, to thereby intermittently move the film from one frame to the next,
    (e) linearly spaced film locking ramps on the inner face of the belt disposed between the film transporting ramps,
    (f) a movable film locking member engageable by the film locking ramps adapted to intermittently lock the film against movement, and
    (g) a shutter adapted to expose the film during the time it is locked against movement.

2. Apparatus in accordance with claim 1 wherein said ramps and shutter are so constructed to provide a ratio of shutter open time to shutter closed time in excess of unity.

3. Apparatus in accordance with claim 1 wherein said shutter is formed as an opaque constantly moving endless belt having windows adapted to pass across and expose the film.

4. Apparatus in accordance with claim 3 wherein a portion of the endless shutter belt is movable perpendicular to said portion of the transport belt.

References Cited

UNITED STATES PATENTS 3,139,790    7/1964    Kipping _____ 352—183 X

FOREIGN PATENTS 50,349    11/1921    Sweden.

NORTON ANSHER, Primary Examiner

M. H. HAYES, Assistant Examiner